United States Patent
Kondo et al.

(10) Patent No.: US 11,221,620 B2
(45) Date of Patent: Jan. 11, 2022

(54) VEHICLE CONTROL SYSTEM

(71) Applicant: TOYOTA JIDOSHA KABUSHIKI KAISHA, Toyota (JP)

(72) Inventors: Suzuka Kondo, Susono (JP); Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 16/275,851

(22) Filed: Feb. 14, 2019

(65) Prior Publication Data
US 2019/0302763 A1    Oct. 3, 2019

(30) Foreign Application Priority Data
Mar. 27, 2018    (JP) .............................. JP2018-060298

(51) Int. Cl.
*G05D 1/00*    (2006.01)
*G05D 1/02*    (2020.01)

(52) U.S. Cl.
CPC ......... *G05D 1/0055* (2013.01); *G05D 1/0212* (2013.01); *G05D 1/0231* (2013.01)

(58) Field of Classification Search
CPC .......... G05D 1/00; G05D 1/02; G05D 1/0061; G05D 1/0212; G05D 1/0231; G05D 1/0055; B60W 30/16; B60W 50/0225; B60W 2050/0008; B60W 2050/0012; B60W 30/10; B60W 40/114; B60W 50/0205; B60W 60/00186; B60W 60/0053; B60W 30/14; B60W 30/12; B60W 2552/53; G06K 9/00798; B60T 8/17557
See application file for complete search history.

(56) References Cited

U.S. PATENT DOCUMENTS

| | | | | |
|---|---|---|---|---|
| 9,195,232 | B1* | 11/2015 | Egnor | B60W 10/20 |
| 2016/0325721 | A1* | 11/2016 | Jonasson | B62D 6/003 |
| 2017/0212513 | A1* | 7/2017 | Iida | B60W 30/10 |
| 2019/0061745 | A1* | 2/2019 | Hatano | B60W 20/15 |

FOREIGN PATENT DOCUMENTS

JP    2013-147194 A    8/2013

* cited by examiner

*Primary Examiner* — Adam R Mott
(74) *Attorney, Agent, or Firm* — Sughrue Mion, PLLC

(57) ABSTRACT

When an abnormality occurs in the main ECU, assist control A or B is executed by the substitute ECU as emergency traveling path control. The assist control A is executed when the target path TP_RS does not intersect the white lane. In the assist control A, feedforward control is executed for making the subject vehicle M travel along the target path TP_RS. In the assist control A, feedback control is also executed to keep the distance LD_CL in the transverse direction from the center of the traveling lane to the reference position. The assist control B is executed when the target path TP_RS intersects the white lane. In the assist control B, only the feedforward control is executed in which the subject vehicle M is controlled to travel along the target path TP_RS.

5 Claims, 13 Drawing Sheets

VEHICLE CONTROL SYSTEM

CROSS-REFERENCE TO RELATED APPLICATION

The present disclosure claims priority under 35 U.S.C. § 119 to Japanese Patent Application No. 2018-60298, filed on Mar. 27, 2018. The content of the application is incorporated herein by reference in their entirety.

TECHNICAL FIELD

The present disclosure relates to a vehicle control system. More specifically, the present disclosure relates a vehicle control system which is configured to execute traveling path control of a vehicle.

BACKGROUND

JP 2013-147194 A discloses a vehicle control system which is configured to execute traveling path control of a vehicle. The conventional system includes a CCD camera and an electric control device which is configured to control wheels (left and right front wheels). The CCD camera is configured to acquire image information ahead of the vehicle and to send it to the electric control device. The electric control device is configured to specify a traveling lane along which the vehicle travels based on the image information. The electric control device is further configured to set a target value of steering angle (target steering angle) of the steering wheels for making the vehicle travel along the current traveling lane.

When there is no signal from the CCD camera, the electric control device specifies the traveling lane based on the image information input just before the absence of the signal and set the target steering angle. Therefore, according to the conventional system, even when an abnormality occurs in the CCD camera, it is possible to make the vehicle to travel along a desired traveling path (i.e., the current traveling lane).

The occurrence of the abnormality can also occur in an electric control device having a function to set a target traveling path (hereinafter also referred to as a "target path"). As a countermeasure in this case, for example, it is conceivable to configure the electric control device with a main device and a substitute device. Specifically, the main device sets and makes backups of the target path until the occurrence of the abnormality in the main device.

And, when the abnormality occurs, on the basis of the backup data just before the occurrence, the substitute device executes processing to set the target path and to set a feedforward operation amount of the steering angle for making the vehicle travel along this target path. According to such emergency processing, even when the abnormality occurs in the main device, it is possible to make the vehicle travel along the target path.

However, the backup data is not the latest information. Therefore, there is a possibility that disturbance is unable to be dealt in the emergency processing. For example, the emergency processing cannot deal with surrounding environment such as occurrence of cross wind or change in road surface condition. In this case, the steering wheel may be steered in a direction deviating from the current traveling lane, which may cause the driver to feel uneasy. In another example, the emergency processing cannot deal with rotating operation of the steering wheel by the driver. In this case, the steering wheel may be steered in a direction contrary to the driver's intention.

The present disclosure addresses the above described problem, and an object of the present disclosure is, to provide a vehicle control system which is able to properly execute emergency traveling path control by a substitute electric control device when an abnormality occurs in a main electric control device.

SUMMARY

A first aspect of the present disclosure is a vehicle control system for solving the problem described above and has the following features.

The vehicle control system is a system which is configured to control a vehicle to travel along a target path.

The vehicle control system includes a main calculation device, a substitute calculation device and a white lane information acquisition device.

The main calculation device is configured to calculate the target path.

The substitute calculation device is configured to calculate the target path when an abnormality occurs in the main calculation device.

The white lane information acquisition device is configured to acquire information on white lane around the vehicle.

The substitute calculation device is further configured to store backup data of the target path calculated by the main calculation device.

The substitute calculation device is further configured to calculate a first target path based on the backup data. The first target path is the target path just before the occurrence of the abnormality in the main calculation device.

The substitute calculation device is further configured to calculate a first feedforward operation amount of steering angle. The first feedforward operation amount is a feedforward operation amount for making the vehicle travel along the first target path.

The substitute calculation device is further configured to calculate a first feedback operation amount based on the information on white lane. The first feedback operation amount is a feedback operation amount for keeping a distance in a lateral direction from the vehicle to a reference line of a traveling lane along which the vehicle travels.

The substitute calculating device is further configured to correct the first feedforward operation amount with the first feedback operation amount when it does not detect an execution of a lane change by the vehicle.

The substitute calculating device is further configured not to correct the first feedforward operation amount with the first feedback operation amount when it detects the execution of the lane change.

A second aspect of the present disclosure has the following features in the first aspect.

The substitute calculation device is further configured to calculate a second target path. The second target path is the target path for maintaining the distance in the lateral direction at the occurrence of the abnormality.

The substitute calculation device is further configured to, when it detects the execution of the lane change, judge progress of first path control based on a combination of an elapsed time since the occurrence of the abnormality and yaw angle or a combination of the elapsed time and the distance in the lateral direction. The first path control is traveling path control in which the vehicle is controlled to travel along the first target path.

The substitute calculation device is further configured to exceptionally start to execute second path control when it is judged that the progress corresponds to before or shortly after the start of the first path control. The second path control is traveling path control in which the vehicle is controlled to travel along the second target path.

A third aspect of the present disclosure has the following features in the second aspect.

The substitute calculation device is further configured to calculate a second feedforward operation amount of steering angle. The second feedforward operation amount is a feedforward operation amount for making the vehicle travel along the second target path.

The substitute calculation device is configured to calculate a second feedback operation amount based on the information on white lane. The second feedback operation amount is a feedback operation amount for keeping the distance in the lateral direction at the occurrence of the abnormality.

The substitute calculation device is further configured to start to execute the second path control based on the second feedforward operation amount.

The substitute calculation device is further configured to start to execute the correction of the second feedforward operation amount with the second feedback operation amount after the start of the second path control.

A fourth aspect of the present disclosure further has the following features in the first aspect.

The substitute calculation device is further configured to calculate a third target path. The third target path is the target path just before the occurrence of the abnormality. The third target path is also the target path that is not the target path for lane change.

The substitute calculation device is further configured to, when it detects the execution of the lane change, judge progress of first path control based on a combination of an elapsed time since the occurrence of the abnormality and yaw angle or a combination of the elapsed time and the distance in the lateral direction. The first path control is traveling path control in which the vehicle is controlled to travel along the first target path.

The substitute calculation device is further configured to exceptionally start third path control when it is judged that the progress corresponds to before or shortly after the start of the first path control. The third path control is traveling path control in which the vehicle is controlled to travel along the third target path.

A fifth aspect of the present disclosure further has the following features in the fourth aspect.

The substitute calculation device is configured to calculate a third feedforward operation amount of steering angle. The third feedforward operation amount is a feedforward operation amount for making the vehicle travel along the third target path.

The substitute calculation device is configured to calculate a third feedback operation amount based on the information on white lane. The third feedback operation amount is a feedback operation amount for keeping the distance in the lateral direction at the occurrence of the abnormality.

The substitute calculation device is further configured to start to execute the third path control based on the third feedforward operation amount.

The substitute calculation device is further configured to start to execute the correction of the third feedforward operation amount with the third feedback operation amount after the start of the third path control.

According to the first aspect, when the execution of the lane change is not detected by the substitute calculating device, the first feedforward operation amount is corrected with the first feedback operation amount. Therefore, it is possible to deal with the disturbance after the occurrence of the abnormality in the main calculation device. Also, according to the first aspect, when the execution of the lane change is detected by the substitute calculating device, the first feedforward operation amount is not corrected with the first feedback operation amount. Therefore, it is possible to prevent the steering angle from being adjusted in an unintended direction by the correction with the first feedback operation amount, and to complete the execution of the lane change. Therefore, it is possible to properly execute emergency traveling path control by the substitute electric control device.

According to the second aspect, the second path control is exceptionally started before or immediately after the start of the first path control based on the first feedforward operation amount. As described earlier, when the execution of the lane change is detected, the correction with the first feedback operation amount is not executed. Therefore, in this case, it is difficult to deal with the disturbance after the start of the first path control, which may interfere with the lane change. In this regard, the second path control is traveling path control in which the vehicle is controlled to travel along the second target path. The second target path is the target path for keeping the distance in the lateral direction at the occurrence of the abnormality. Therefore, when the second path control is executed, it is possible to make the vehicle safely travel along the lane before the lane change whereas the lane change itself is canceled.

According to the third aspect, the correction of the second feedforward operation amount with the second feedback operation amount is started after the start of the second path control. When the correction with the second feedback operation amount is started simultaneously with that of the second path control, there is a possibility that the steering angle is adjusted in an unintended direction. In this regard, when the correction with the second feedback operation amount is started after the start of the second path control, it is possible to adjust the steering angle after the steering angle has stabilized to a certain extent. Therefore, it is possible to execute the second path control appropriately.

According to the fourth aspect, the third path control is exceptionally started before or immediately after the start of the first path control based on the first feedforward operation amount. As described earlier, when the execution of the lane change is detected, since the correction with the first feedback operation amount is not executed, the lane change may be interfered. In this regard, the third path control is traveling path control in which the vehicle is controlled to travel along the third target path. The third target path is the target path which is the target path just before the occurrence of the abnormality and is not the target path for lane change. Therefore, when the third path control is executed, it is possible to make the vehicle safely travel along the lane before the lane change whereas the lane change itself is canceled.

According to the fifth aspect, the correction of the third feedforward operation amount with the third feedback operation amount is started after the start of the third path control. When the correction with the third feedback operation amount is started after the start of the second path control, it is possible to adjust the steering angle after the steering angle has stabilized to a certain extent. Therefore, it is possible to execute the third path control appropriately.

DESCRIPTION OF EMBODIMENT

Figure 1:
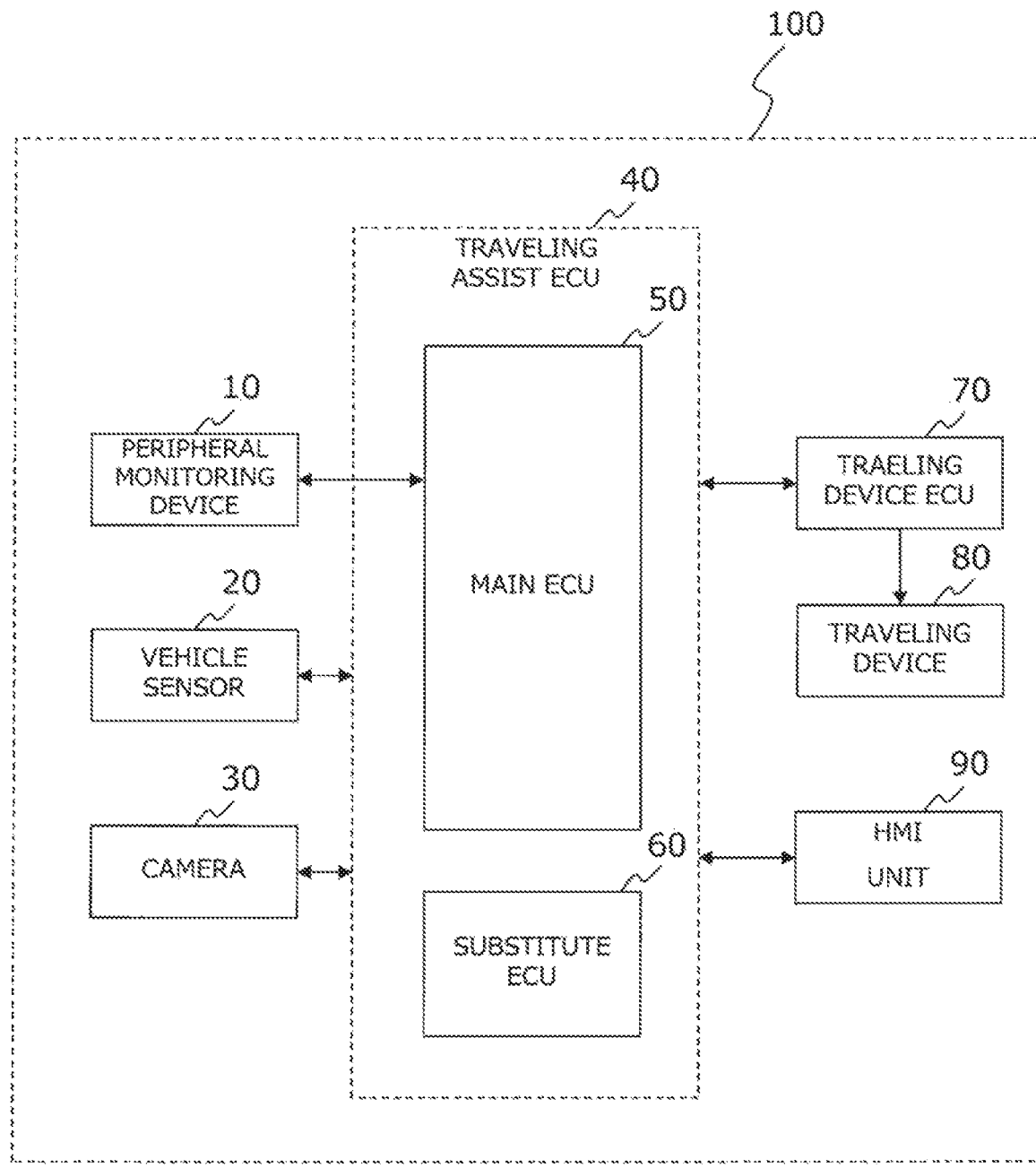
FIG. 1 is a block diagram for showing a configuration example of a vehicle control system according to a first embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

First, a first embodiment of the present disclosure will be described with reference to FIGS. 1 to 6.

1. Configuration of Vehicle Control System 1.1 Overall Configuration

FIG. 1 is a block diagram for showing a configuration example of a vehicle control system according to the first embodiment. The vehicle control system 100 shown in FIG. 1 is mounted on a vehicle. The vehicle equipped with a vehicle control system 100 (hereinafter also referred to as a "subject vehicle M") is a vehicle powered by an internal combustion engine such as a diesel engine or a gasoline engine, an electronic vehicle powered by an electric motor, a hybrid vehicle equipped with the internal combustion engine and the electric motor. The electric motor is driven by batteries such as secondary batteries, hydrogen fuel cells, metal fuel cells, alcohol fuel cells and the like.

The vehicle control system 100 includes a peripheral monitoring device 10, a vehicle sensor 20, a camera 30, a traveling assist ECU (Electric Control Unit) 40, a traveling device ECU 70, a traveling device 80, and a HMI (human machine interface) unit 90.

The peripheral monitoring device 10 detects the circumstances of the subject vehicle M. Examples of the peripheral monitoring device 10 include a millimeter wave radar, a LIDER (Laser Imaging Detection and Ranging) and a sonar. The millimeter wave radar detects a landmark around the subject vehicle M with radio waves. The LIDER uses light to detect the landmark around the subject vehicle M. The sonar detects the landmark around the subject vehicle M with ultrasonic waves. The millimeter wave radar, the LIDER and the sonar do not necessarily have to be prepared in duplicate. The peripheral monitoring device 10 transmits the detected information to the traveling assist ECU 40.

The vehicle sensor 20 detects traveling state of the subject vehicle M. Examples of the vehicle sensor 20 include a vehicle speed sensor, an acceleration sensor, a yaw rate sensor, a steering angle sensor and a steering torque sensor. The vehicle speed sensor detects speed (vehicle speed) of the subject vehicle M. The acceleration sensor detects acceleration of the subject vehicle M. The yaw rate sensor detects yaw rate acting on the subject vehicle M. The steering angle sensor detects steering angle from rotation angle of a rotation shaft of an EPS (Electric Power Steering) motor. The steering torque sensor detects torque input into a pinion shaft as steering torque by a rotating operation of a steering wheel operated by the driver. The steering angle and the steering torque are detected as positive when steering or steering in the leftward turning direction of the subject vehicle M. The vehicle sensor 20 transmits the detected information to the traveling assist ECU 40.

The camera 30 images external situation of the subject vehicle M. The camera 30 is, for example, a digital camera using a solid-state imaging device such as a CCD (Charge Coupled Device) or CMOS (Complementary Metal Oxide Semiconductor). The camera 30 may be a monocular camera or a stereo camera. The camera 30 transmits a shot image to the traveling assist ECU 40. The camera 30 may include an image processing device. Based on the shot image, the image processing device recognizes a marker of a lane around the subject vehicle M (hereinafter also referred to as a "white lane WL" or "lane line"). The image processing device calculates a shape of a traveling lane along which the subject vehicle travels and a positional relationship between the white lane WL and the subject vehicle M based on the information on the recognized white lane WL. The image processing device transmits these information to the traveling assist ECU 40.

When traveling path control (also referred to as "autonomous vehicle control") is turned on an activate mode, the traveling assist ECU 40 executes various processing necessary for the execution thereof. The traveling assist ECU 40 includes a main ECU 50 and a substitute ECU 60 as a configuration for performing these various processing. The main ECU 50 or the substitute ECU 60 is a typically microcomputer which is equipped with a processor, memory and input and output interfaces.

The main ECU 50 or the substitute ECU 60 receives various information via the input and output interfaces. The main ECU 50 or the substitute ECU 60 also executes various processing necessary for executing the traveling path control based on the various information. However, in the present embodiment, processing executed by the substitute ECU 60 is limited to a part of the processing executed by the main ECU 50. The reason for this is that the substitute ECU 60 is mounted as a backup ECU for the main ECU 50. Thus, throughput capacity of the substitute ECU 60 is not as high as that of the main ECU 50. For this reason, information from the peripheral monitoring device 10 is not input into the substitute ECU 60. That is, the substitute ECU 60 executes various processing for the traveling path control based on information from the vehicle sensor 20 and the camera 30.

The traveling device ECU 70 is a microcomputer having a typical configuration similar to the traveling assist ECU 40. The traveling device ECU 70 is composed of a plurality of ECUs. These ECUs execute various processing necessary for operating the traveling device 80 in accordance with the information input from the traveling device ECU 70. The traveling device ECU 70 contains a controller for an EPS device. The EPS controller operates an inverter of the EPS device in accordance with the information input from the traveling device ECU 70.

The traveling device 80 includes the EPS device. The EPS device is, for example, a rack and pinion type steering device, which is equipped with a steering wheel, a steering shaft, and a steering actuator. The steering wheel is fixed to the steering shaft. The steering shaft is connected to the pinion shaft. The pinion shaft is arranged at a predetermined intersection angle with a rack shaft provided for the steering actuator. The left and right front wheels are assembled at both ends of the rack shaft.

One of pinion gears formed on the pinion shaft mesh with rack gears formed on the rack shaft, thereby constituting a rack and pinion mechanism. According to the rack and pinion mechanism, rotation of the steering shaft is converted to axial displacement of the rack shaft, and the steering angle of the steering wheel is changed. The pinion shaft is connected to the rotation shaft of the EPS motor via a reduction mechanism such as a worm and a wheel. In the EPS motor, an inverter that applies a voltage to each terminal of the EPS motor is connected. The rack shaft, the pinion shaft, the speed reduction mechanism, the EPS motor and the inverter constitute a steering actuator.

The HMI unit 90 is an interface for providing information to the driver of the subject vehicle M and receiving information from the driver. The HMI unit 90 transmits information input from the driver to the traveling assist ECU 40. The HMI unit 90 provides information input from the traveling assist ECU 40 to the driver. The HMI unit 90 includes, for example, an input device, a display device and a sound device. Examples of the input device include a touch panel, a keyboard, a switch and a button. Examples of the display device include a HUD (Head-Up Display), a navigation system display and an instrument cluster for vehicle. Examples of sound devices include a buzzer, a speaker and a microphone. The driver is able to switch between the activate mode for executing the traveling path control and an inactive mode for not executing the control with the HMI unit 90.

1.2 Configuration of Main ECU 50

Figure 2:
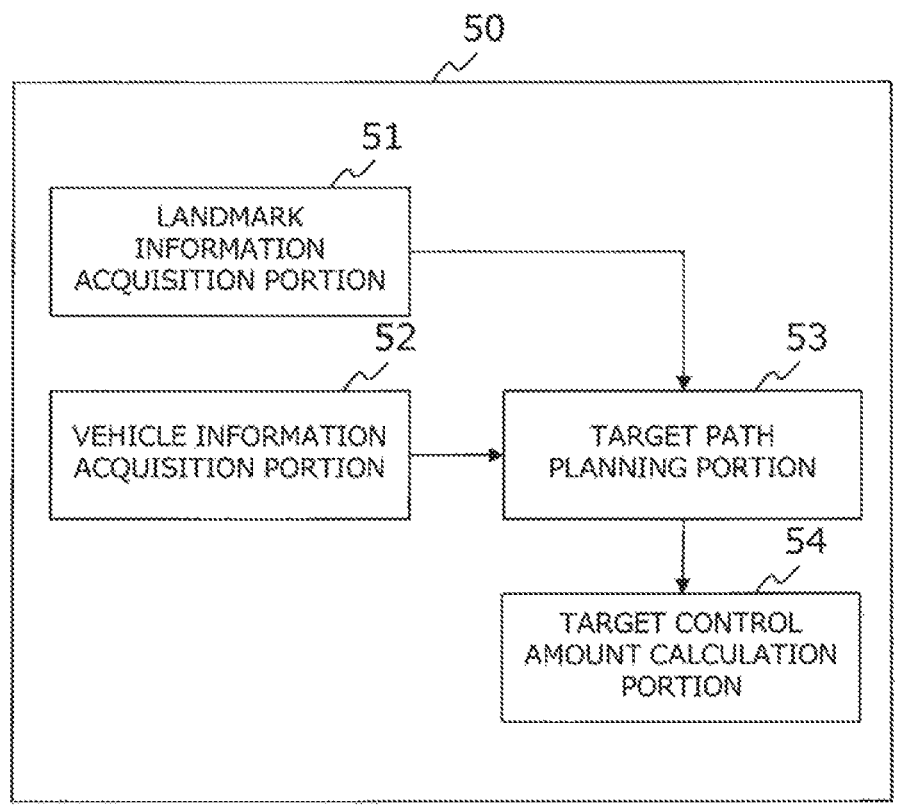
FIG. 2 is a block diagram for showing a functional configuration example of a main ECU shown in FIG. 1.

FIG. 2 is a block diagram for showing a functional configuration example of the main ECU 50 shown in FIG. 1. In FIG. 2, focusing on functions relevant to the steering assist of the main ECU 50 will be described. As the functions relevant to the steering assist, the main ECU 50 includes a landmark information acquisition portion 51, a vehicle information acquisition portion 52, a target path planning portion 53, and a target control amount calculation portion 54. These function blocks are realized when the processor of the main ECU 50 executes control program stored in the memory. The control program may be stored in a computer readable recording medium.

The portion 51 acquires information from the peripheral monitoring device 10 and the camera 30, and generates information on landmarks around the subject vehicle M (hereinafter also referred to a "landmark information"). The landmark around the subject vehicle M includes a moving landmark and a stationary landmark. Examples of the moving object include vehicles, motorcycles, bicycle and walker. Information on moving landmark includes position, speed and size of the moving landmark. Examples of the stationary landmark include the white lane WL and signs. Information on stationary landmark includes location and size of the stationary landmark.

The portion 52 acquires information from the vehicle sensor 20 and generates information on traveling state of the subject vehicle M (hereinafter also referred to as "information on vehicle"). The portion 52 also acquires information from the vehicle sensor 20 and generates information on driver's involvement in driving (hereinafter also referred to as "driver information"). The driver information includes information on steering wheel holding state of the driver. Specifically, the information on steering wheel holding state is information from the steering torque sensor.

The portion 53 plans a target path TP based on the landmark information and the information on vehicle and driver information. The target path TP is defined as a set of target positions where a reference position of the subject vehicle M has to reach. Examples of the reference position of the subject vehicle M include a gravity center of the subject vehicle M and a center of the rear wheel axis. When setting the target positions, fusion processing of the landmark information is executed, whereby the positions of the subject vehicle M are specified with high accuracy. The target positions are set at the center of a traveling lane along which the subject vehicle M travels. However, the target positions may be set at positions other than the center of the traveling lane. The target positions may be set at positions to prevent departure from the traveling lane. The target path TP is calculated at a predetermined calculation cycle. The setting processing of the target path TP is not particularly limited. That is, well-known processing is applicable to the setting processing of the target path TP.

The portion 54 calculates target steering angle of the subject vehicle M for making the subject vehicle travel along the target path TP. For example, the portion 54 sets a feedforward operation amount of the steering angle based on the target path TP and the vehicle speed. The portion 54 also corrects the feedforward operation amount by a feedback operation amount for controlling a feedback control amount to a target value. The feedback control amount includes the yaw rate and yaw angle. The yaw angle is angle formed between longitudinal axis of the subject vehicle M and the traveling lane. The feedback control amount also includes a distance LD_CL in a transverse direction (i.e., vehicles width direction) from the center of the traveling lane to the reference position.

The portion 54 also acquires target steering torque by which the target steering angle is realized and calculates target steering assist torque based on deviation between the target steering torque and actual steering torque. The portion 54 calculates a command value for steering torque according to magnitude of the target steering assist torque. The portion 54 transmits the command value for steering torque to the EPS controller.

1.3 Configuration of Substitute ECU 60

Figure 3:
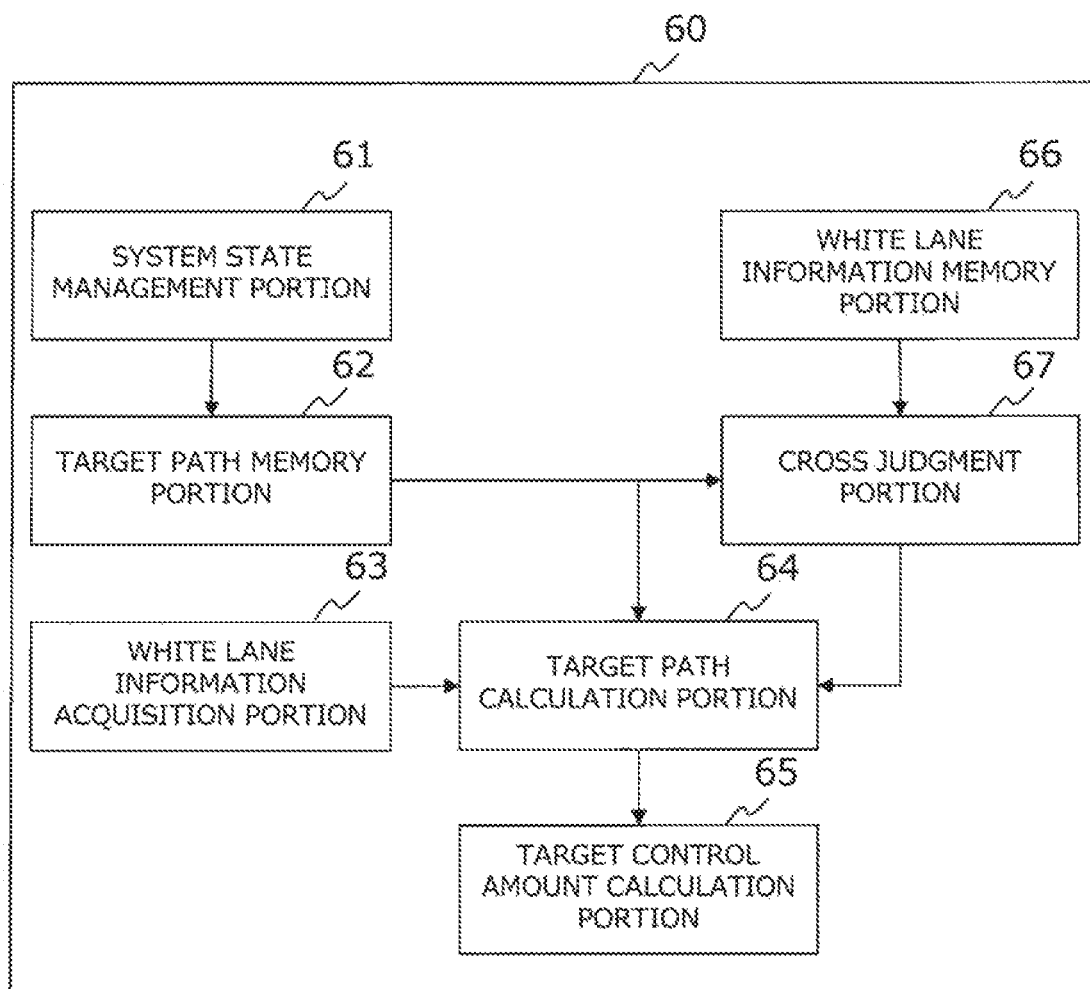
FIG. 3 is a block diagram for showing a functional configuration example of a substitute ECU shown in FIG. 1.

FIG. 3 is a block diagram for showing a functional configuration example of the substitute ECU 60 shown in FIG. 1. In FIG. 3, focusing on backup function of the substitute ECU 60 will be described. As the function block relevant to the backup, the substitute ECU 60 includes a system state management portion 61, a target path memory portion 62, a white lane information acquisition portion 63, a target path calculation portion 64, a target control amount calculation portion 65, a white lane information memory portion 66 and a cross judgment portion 67. These function blocks are realized when the processor of the substitute ECU 60 executes control program stored in the memory.

The portion 61 manages overall state of the vehicle control system 100. An object of the management of the portion 61 includes state of the main ECU 50. The portion 61 judges whether or not the main ECU 50 operates properly. When receiving abnormality information indicating that an abnormality has occurred in the main ECU 50, the portion 61 judges that the main ECU 50 is not working properly.

The portion 62 stores the target path TP planned by the portion 53 when the main ECU 50 operates properly. In the portion 62, coordinate data (i.e., backup data) of the target positions constituting the target path TP is stored in chronological order. However, the storage of coordinate data is assumed to be temporary. That is, after a certain period of time, the coordinate data is sequentially erased. The portion 62 transmits the stored coordinate data to the portions 64 and 67.

The portion 63 acquires information from the camera 30 and generates information on white lane WL around the subject vehicle M. Specifically, the portion 63 recognizes the white lane WL based on the shot image of the camera 30. In addition, the portion 63 calculates the distance LD_CL (i.e., the distance in the transverse direction from the center of the traveling lane to the reference position) based on the recognized white lane WL. If the camera 30 includes the image processing device, the portion 63 may extract the distance information from the information on positional relationship of the subject vehicle M. The portion 63 transmits the distance information to the portion 64.

The portion 64 restores the target path TP based on the backup data from the portion 62. The restored target path TP (hereinafter also referred to as a "target path TP_RS") is defined as a set of past target positions where the reference position had to reach and also which has been planned just before the occurrence of the abnormality in the main ECU 50. When the main ECU 50 operates properly, it is not necessary to proactively restore the past target positions. The portion 64 transmits the information on the target path TP_RS to the portion 65.

The portion 65 calculates target steering angle for making the subject vehicle M travel along the target path TP_RS. For example, the portion 65 sets the feedforward operation amount of the steering angle based on the target path TP_RS and the current vehicle speed. Based on the distance information from the portion 63, the portion 65 further calculates the feedback operation amount for controlling the feedback control amount to the target value. The portion 65 corrects the feedforward operation amount in accordance with the calculated feedback operation amount. However, the feedback control amount is only the distance LD_CL. The reason for this is to ensure that the substitute ECU 60 executes essential processing for suppressing the deviation of the subject vehicle M from the traveling lane.

After restoring the target path TP, the portion 64 further sets a target path TP in front of a tip of the target path TP_RS (hereinafter referred to as a "target path TP_FR"), based on the distance information from the portion 63. The target path TP_FR is a travel path is defined as a set of target positions where the reference position has to reach after the subject vehicle M passes the tip of the target path TP_RS. This target positions are set at the center of the traveling lane. Information on the target path TP_FR set by the portion 64 is transmitted to the portion 65.

The portion 65 calculates the target steering angle for making the subject vehicle M travel along the target path TP_FR. For example, the portion 65 sets the feedforward operation amount of the steering angle based on the target path TP_FR and the current vehicle speed. The portion 65 also calculates the feedback operation amount for controlling the distance LD_CL to the target distance based on the distance information from the portion 63. The portion 65 corrects the feedforward operation amount in accordance with the calculated feedback operation amount.

When the main ECU 50 operates properly, the portion 66 stores the positional information of the white lane WL by the portion 51 in chronological order. The portion 66 stores the coordinate data (i.e., the backup data) of the positions there the white lane WL was recognized in chronological order. The portion 62 transmits the stored coordinate data to the portion 67. However, the storage of coordinate data is assumed to be temporary. That is, after a certain period of time has elapsed from the storage, the coordinate data is sequentially erased.

The portion 67 restores the target path TP based on the backup data from the portion 62. The portion 67 judges whether or not the target path TP_RS intersects the white lane WL based on the target path TP_RS (i.e., the restored target path TP just before the occurrence of the abnormality) and the coordinate data from the portion 66. The portion 67 transmits the judgement result on the intersection to the portion 64.

2. Features of Traveling Path Control According to First Embodiment

In the first embodiment, when the abnormality occurs in the main ECU 50, three kinds of assist control A, B and C are executed as emergency traveling path control. The processing for the assist control A, B and C is executed in the substitute ECU 60 described in FIG. 3.

2.1 Assist Control A

Figure 4:
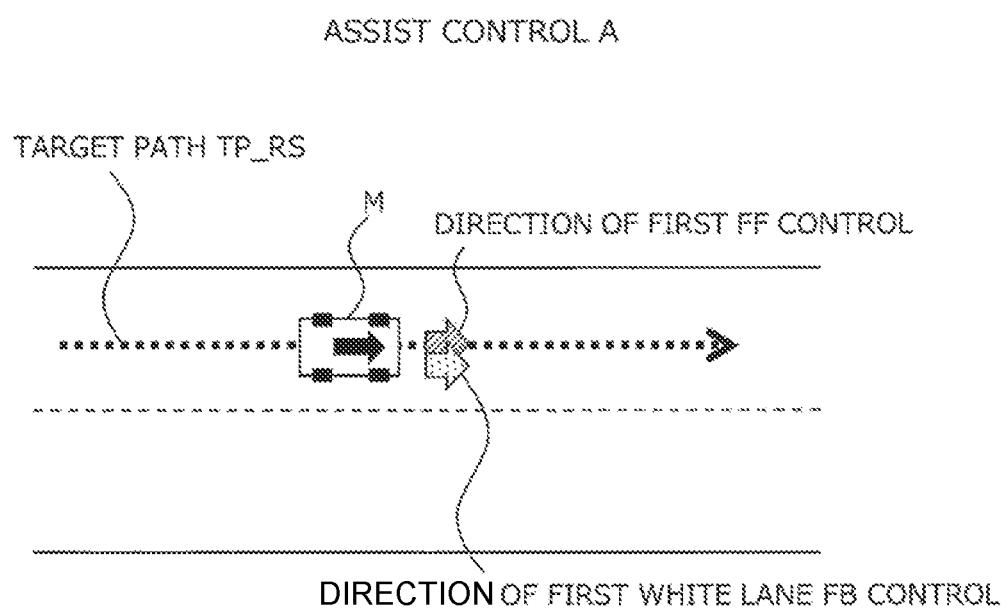
FIG. 4 is a diagram for describing an outline of assist control A.

The assists control A is executed when the target path TP_RS does not intersect the white lane WL. In assist control A, feedforward control is executed in which the subject vehicle M is controlled to travel along the target path TP_RS. In the assist control A, feedback control is also executed in which the distance LD_CL in the transverse direction from the center to the reference position of the traveling lane is kept at the target distance. FIG. 4 is a diagram for describing an outline of the assist control A. As shown in FIG. 4, in the assist control A, a first FF (Feed Forward) control is executed. The first FF control is feedforward control based on the target path TP_RS and the current vehicle speed. The first FF control corresponds to "feedforward control for making the subject vehicle M travel along the target path TP_RS".

In the assist control A, a first white lane FB (Feed Back) control is also executed. The first white lane FB control feedback control with the distance LD_CL as the feedback control amount. The first white lane FB control corresponds to "feedback control for keeping the distance LD_CL at the target distance". When the first white lane FB control is executed, it is possible to deal with the disturbance after the occurrence of the abnormality. Therefore, it is possible to suppress the deviation of the subject vehicle M from the traveling lane after the occurrence of the abnormality.

2.2 Assist Control B

In FIG. 4, an adjustment direction (i.e., the direction of the first FF control) of the target steering angle based on the first FF control approximately matches that (i.e., the direction of the first white lane FB control) of the target steering angle based on the first white lane FB control. However, there are exceptions where the adjustment directions do not match each other. The exceptions include a case where a lane change was planned just before the occurrence of an abnormality. In this case, the adjustment direction of the target steering angle based on the first FF control is a direction to shrink the distance LD_CL. That is, in this case, the adjustment direction of the target steering angle based on the first FF CONTROL does not match the one based on the first white lane FB control.

Figure 5:
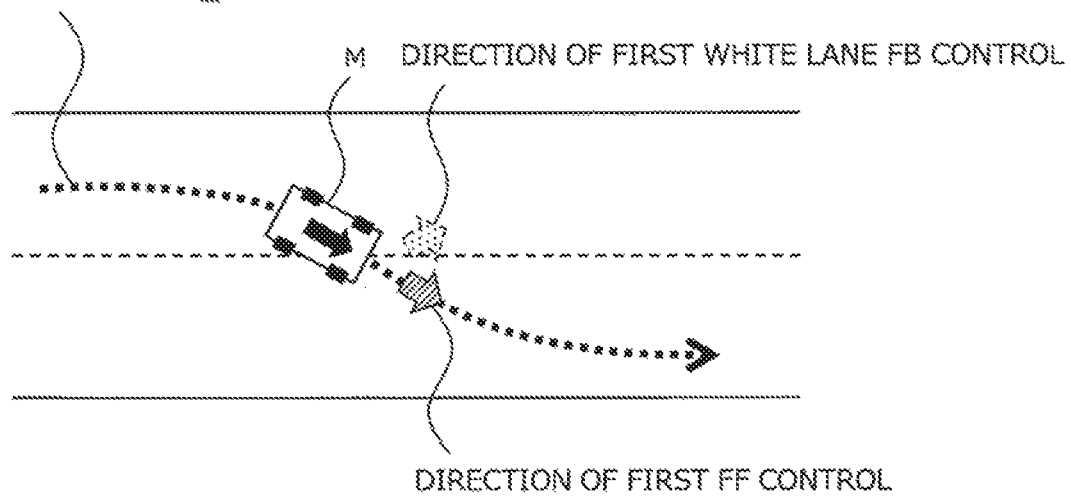
FIG. 5 is a diagram for describing an outline of assist control B.

The assist control B is executed in such a case. The assists control B is executed when the target path TP_RS intersects the white lane WL. In the assist control B, only the feedforward control is executed in which the subject vehicle M is controlled to travel along the target path TP_RS. FIG. 5 is a diagram for describing an outline of the assist control B. As shown in FIG. 5, in the assist control B, only the first FF control is executed. The content of this first FF control is the same as the one executed in the assist control A.

Unlike the assist of A, the first white lane FB control is not executed in the assist control B. Therefore, it is possible to prevent the target steering angle from being adjusted in a direction indicated with a dotted arrow in FIG. 5. That is, according to the assist control B, it is possible to prevent the target steering angle from being adjusted in an unintended direction. Therefore, it is possible to make the subject vehicle M travel along the target path TP_RS and to complete the lane change.

2.3 Assist Control C

The assist control C is executed following the execution of the assist control A or B. The first FF control executed by the assist control A or B is executed on the premise that the target path TP just before the occurrence of the abnormality is restored. Therefore, in order to make the subject vehicle M travel after it reaches an end of the restored target path TP, an additional assist control is needed to execute. The assist control C is executed in such a case. In the assist control C, the feedforward control is executed based on the target path TP_FR and the current vehicle speed. In the assist control C, the fed back control is also executed in which the distance LD_CL is kept a the target distance.

3. Specific Processing

Figure 6:
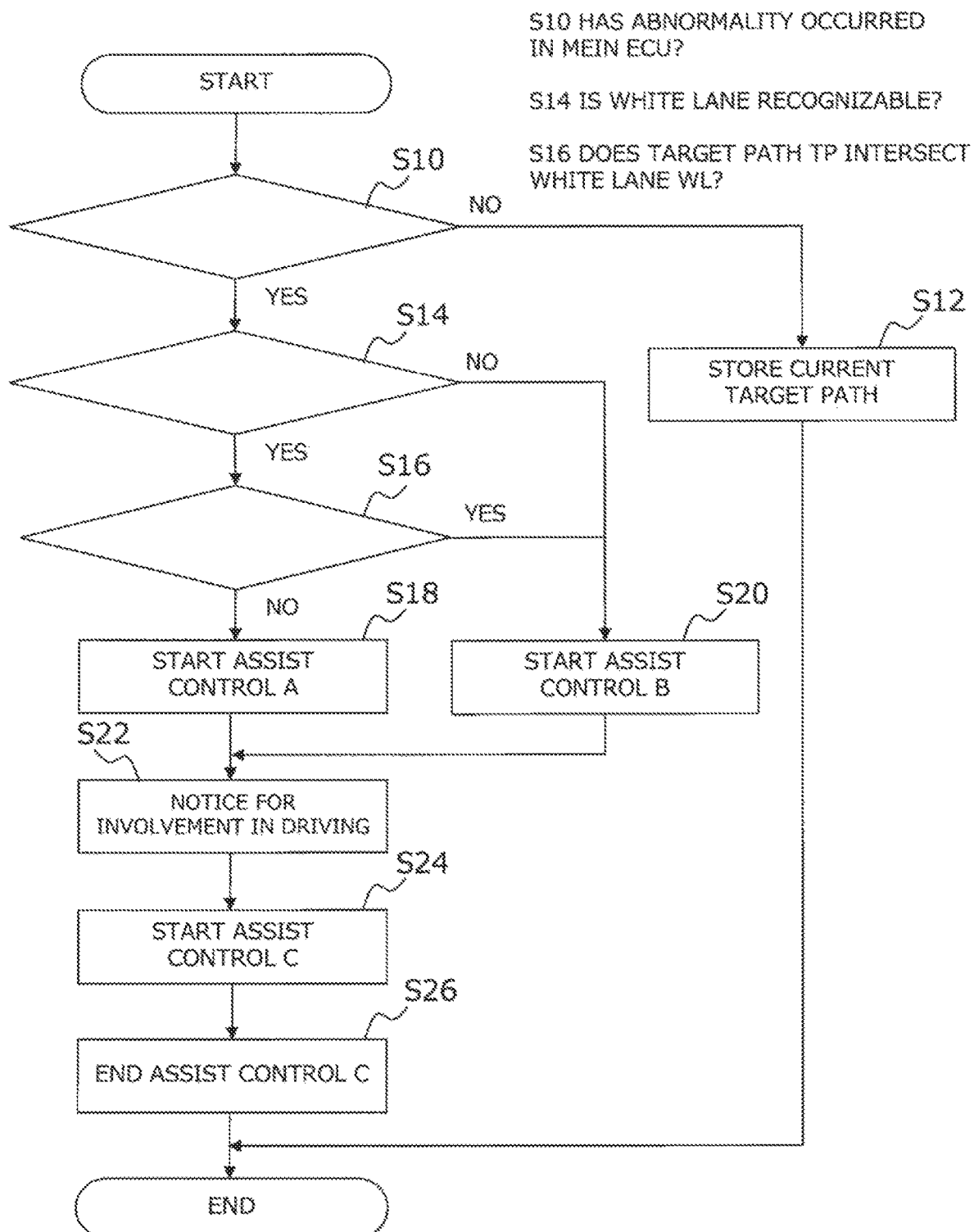
FIG. 6 is a flowchart for describing processing flow when the substitute ECU executes traveling path control in the first embodiment.

FIG. 6 is a flowchart for describing processing flow when the substitute ECU executes traveling path control in the first embodiment. It should be noted that the routine shown in FIG. 6 is repeatedly executed at a predetermined control period while the activate mode for executing the traveling path control is selected.

As shown in FIG. 6, the substitute ECU 60 firstly judges whether or not the abnormality has occurred in the main ECU 50 (step S10). The judgement processing is executed based on whether or not the substitute ECU 60 detects the abnormality information. When it is judged that there is no abnormality information, the substitute ECU 60 stores the current target path TP (step S12).

When it is judged in the step S10 that there is the abnormality information, the substitute ECU 60 judges whether or not the white lane WL is recognizable (step S14). When it is judged that the white lane WL is recognizable, the substitute ECU 60 judges whether or not the target path TP_RS intersects the white lane WL (step S16). As the target path TP_RS, the target path TP just before the judgement processing of the step S14 is used. The judgement processing of the step S14 is executed based on the presence or absence of coordinate data representing the white lane WL that coincides with coordinate data representing the target path TP, for example.

In step S16, when it is judged that the target path TP does not intersect the white lane WL, the substitute ECU 60 starts to execute the assist control A (step S18). On the Other hand, when it is judged in the step S14 that the white lane WL is unrecognizable or when it is judged in the step S16 that the target path TP intersects the white lane WL, the substitute ECU 60 starts to execute the assist control B (step S20).

Subsequent to the step S18 or S20, the substitute ECU 60 notifies the driver a notice for involvement in driving (step S22). The notice for involvement in driving is executed with the display device and sound device of the HMI unit 90.

Subsequent to the step S22, the substitute ECU 60 starts to execute the assist control C with end processing oldie assist control A or B (step S24). Then, the substitute ECU 60 ends the execution of the assist control C (step S26). The end of the assist control C is judged based on whether or not the substitute ECU 60 detects an involvement in driving by the driver during the execution of the assist control C. The judgement processing is executed based on the information from the steering torque sensor.

4. Advantageous Effect

According to the traveling path control of the first embodiment described above, even when the abnormality occurs in the main ECU 50, the assist control A or B is started to execute by the substitute ECU 60. According to the assist control A, the first white lane FB control is executed. Therefore, it is possible to deal with the disturbance after the occurrence of the abnormality. On the contrary, according to the assist control B, the first white FB control is not executed. Therefore, it is possible to prevent the target steering angle from being adjusted in the unintended direction by the execution of the first white lane FB control. Hence, it is possible to turn on or off the first white lane FB control in accordance with the target path TP_RS and to make the subject vehicle M travel along the target path TP_RS.

According to the traveling path control of the first embodiment, the notice for involvement in driving is notified after the assist control A or B is started to execute. In addition, the assist control C is started to execute with the end of the execution of the assist control A or B. Therefore, it is possible to leave a margin in the system-driver handover.

In the first embodiment, the main ECU 50 corresponds to the "main calculation device" of the first aspect. The substitute ECU 60 corresponds to the "substitute calculation device" of the first aspect. The camera 30 corresponds to the "white lane information acquisition device" of the first aspect. The target path TP_RS corresponds to the "first target path" of the first aspect. The center of the traveling lane corresponds to the "reference line on the traveling lane" of the first aspect.

Second Embodiment

A second embodiment of the present disclosure will be described with reference to FIGS. 7 to 9. Note that since the overall configuration of the vehicle control system according to the second embodiment and the configuration of the main ECU are common to the first embodiment, description thereto are omitted. The configuration of the substitute ECU common to the first embodiment is appropriately omitted.

1. Description of Vehicle Control System 1.1 Configuration of Substitute ECU 60

Figure 7:
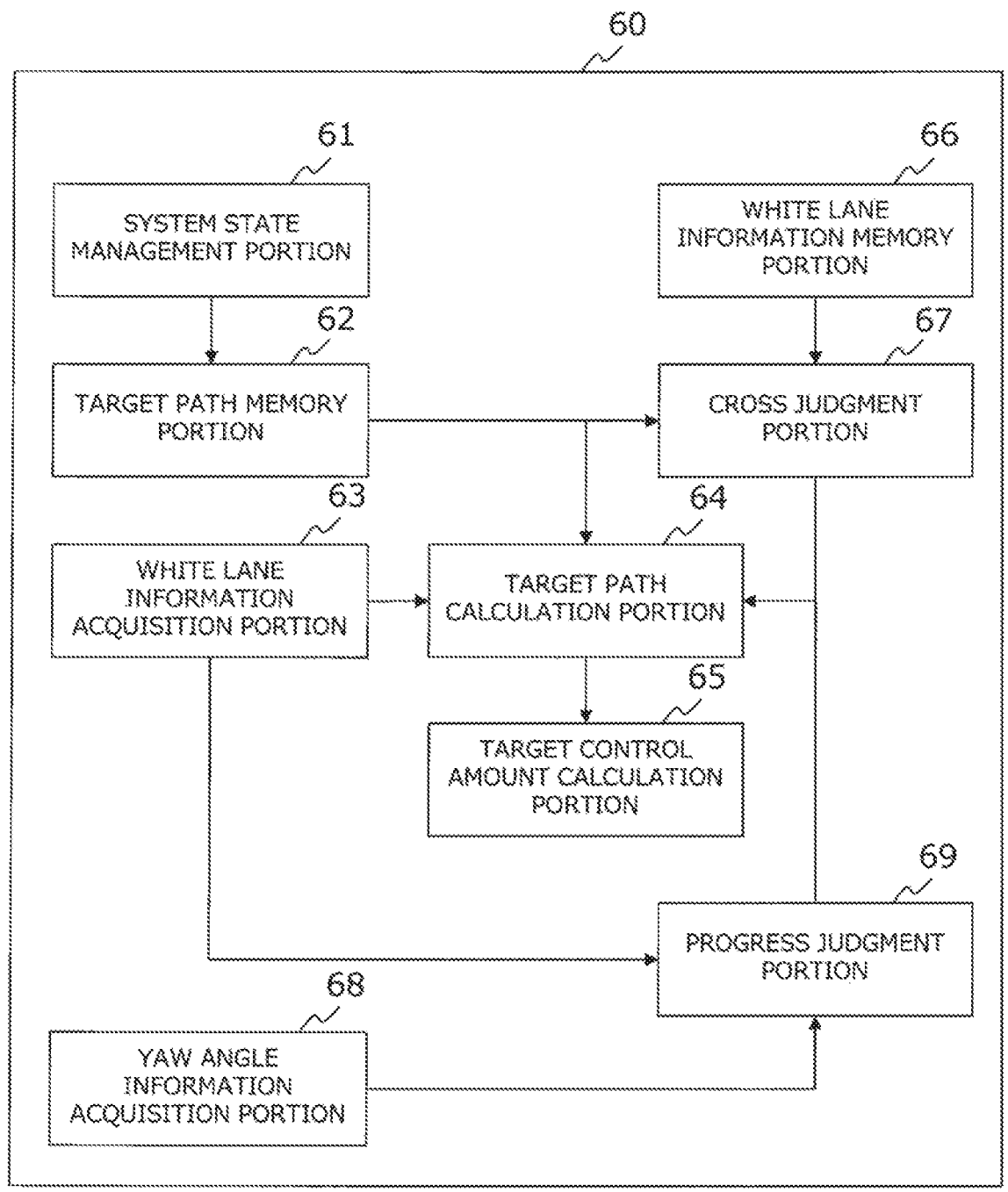
FIG. 7 is a block diagram for showing a functional configuration example of the substitute ECU according to a second embodiment of the present disclosure.
Figure 8:
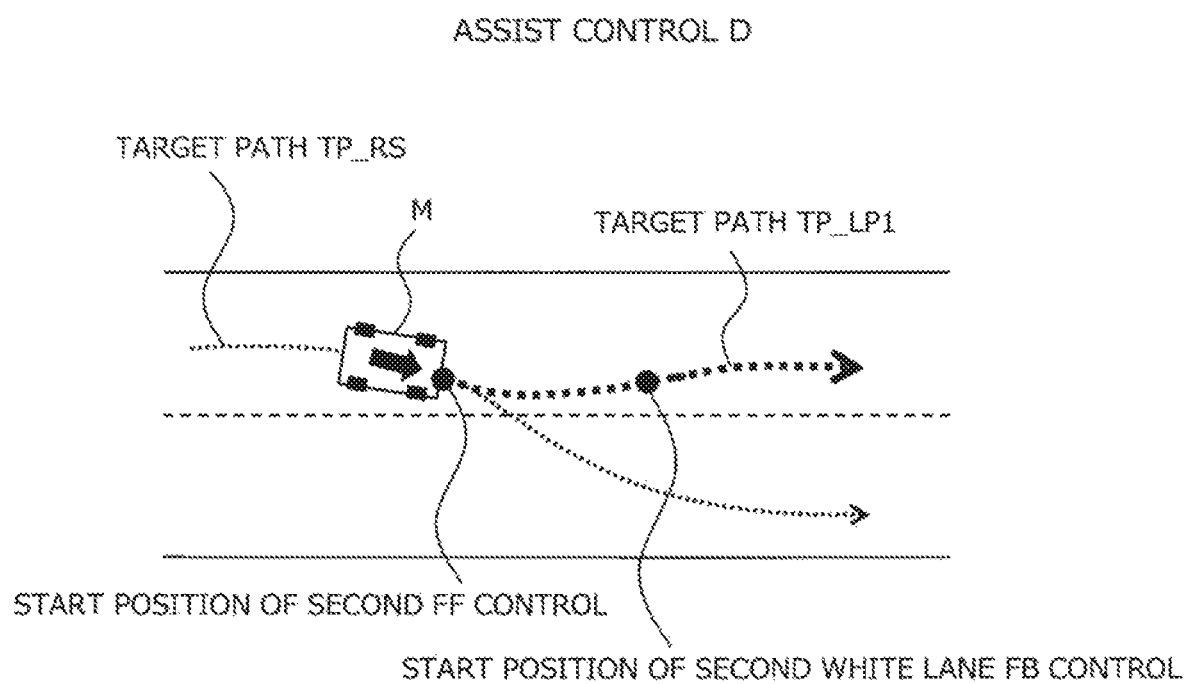
FIG. 8 is a diagram for describing an outline of assist control D.

FIG. 7 is a block diagram for showing a functional configuration example of the substitute ECU 60 according to the second embodiment. As a function block relevant to the backup, the substitute ECU 60 includes the portions 61 to 67, a yaw angle information acquisition portion 68 and a progress judgment portion 69. These function blocks are realized when the processor of the substitute ECU 60 executes control program stored in the memory.

The portion 68 acquires information from the yaw rate sensor and calculates the yaw angle. The portion 68 transmit the calculated yaw angle information to the portion 69.

The portion 69 calculates an elapsed time TL from the occurrence of the abnormality to the present. The portion 69 judges the progress of the assist control B based on the information on the elapsed time TL and the yaw angle information from the portion 68. For example, when the elapsed time TL is shorter than threshold THL and also the yaw angle is smaller than a threshold THY, the portion 69 judges that it is before or immediately after the assist control B. The portion 69 transmits the judgement result on the progress to the portion 64.

As another example, the portion 69 makes a judgement on the progress of the assist control B based on the information on elapsed time and the distance information from the portion 63. For example, when the elapsed time TL is shorter than the threshold THL and also the distance LD_CL is shorter than the threshold THD, the portion 69 judges that it is before or immediately after the assist control B. The portion 69 transmits the judgement result on the progress to the portion 64.

The portion 64 restores the target path TP based on the backup data from the portion 62. That is, the portion 64 calculates the target path TP_RS. However, when the judgement result indicating that it is before or after the start of the assist control B is received from the portion 69, the portion 64 calculates the target path TP for keeping a lateral position LP1 at the occurrence of the abnormality (hereinafter referred to as a "target path TP_LP1"). That is, the portion 64 calculates the target path TP_LP1 separately from the target path TP_RS. The target path TP_LP1 is set to branch from the middle of the target path TP_RS.

The portion 65 calculates the target steering angle for make the subject vehicle M travel along the target path TP_RS or the target path TP_LP1. The case of calculating the target steering angle along the target path TP_RS has already been described. When calculating the target steering angle along the target path TP_LP1, the portion 65 sets the feedforward operation amount of the steering angle based on the target path TP_LP1 and the current vehicle speed.

Based on the distance information from the portion 63, the portion 65 also calculates the feedback operation amount for keeping the lateral position LP1. The portion 65 corrects the feedforward operation amount with the calculated feedback operation amount. However, when the correction of the feedforward operation amount is started simultaneously with the calculation of this amount, there is a possibility that the target steering angle is adjusted in an unintended direction. Therefore, the portion 65 starts the calculation of the feedback operation amount for keeping the lateral position LP1 after the start of the calculation of the feedforward operation amount.

As another example, when the portion 65 calculates the target steering angle for making the subject vehicle M travel along the target path TP_LP1 (hereinafter also referred to as "target steering angle TA_LP1"), it may calculate another target steering angle (hereinafter also referred to as "target steering angle TA_A") based on the yaw angle information at the occurrence of the abnormality. Specifically, the target steering angle TA_A is the target steering angle for decreasing the yaw angle, and also is easy to calculate as compared with the target steering angle TA_LP1. That is, in this alternative example, during the calculation of the target steering angle TA_LP1, the feedforward operation amount of the steering angle may be set based on the target steering angle TA_A calculated in a shorter time than the target steering angle TA_LP1.

During the calculation of the target steering angle TA_LP1, the subject vehicle M travels along the target path TP_RS. That is, the lane change continues to progresses during the calculation of the target steering angle TA_LP1. Therefore, when it takes time to calculate the target steering angle TA_LP1, the lateral position of the subject vehicle M at the completion of the calculation of the target steering angle TA_LP1 greatly departs from the lateral position LP1. In this regard, when the feedforward operation amount of the steering angle is set based on the target steering angle TA_A, it is possible to decrease the distance between the lateral position of the subject vehicle M and the lateral position LP1 at the completion of the calculation of the target steering angle TA_LP1.

2. Features of Traveling Path Control According to Second Embodiment

In the second embodiment, when the abnormality occurs in the main ECU 50, the assist control A, B and C are executed. This is the same as the first embodiment. In the second embodiment, furthermore, assist control D is started to execute when a predetermined condition is satisfied during the execution of the assist control B. The processing for the assist controls from A to D is executed in the substitute ECU 60 shown in FIG. 7.

2.1 Assist Control D

The assist control D is executed when it is judged that it is before or immediately after the start of the assist control B. In the assist control D, the feedforward control is executed to make the subject vehicle M travel along the target path TP_LP1. In the assist control D, the feedback control is further executed to keep the lateral position LP1. FIG. 8 is a diagram for describing an outline of the assist control D. As shown in FIG. 8, in the assist control D, second FF control is executed. The second FF control is feedforward control based on the target path TP_LP1 and the current vehicle speed. The second FF control is started to execute before or immediately after the start of the assist control B. The start position of the second FF control shown in FIG. 8 represents a switching point between the assist controls B and D immediately after the start of the assist control B.

In the assist control D, second white lane FB control is also executed. The second white lane FB control is feedback control with the distance LD_CL as the feedback control amount. The lateral position LP1 is typically the middle of the lane before the lane change. In this case, the content of the second white lane FB control is substantially the same as that of the first white lane FB control. However, when the abnormality occurs in the main ECU 50 during the lane change, the lateral position LP1 deviates from the center of the traveling lane. Therefore, in such a case, the feedback operation amount is set to keep the distance LD_CL which was calculated based on the distance information at the occurrence of the abnormality. The start position of the second white lane FB control shown in FIG. 8 is positioned ahead of that of the second FF control. This is because that the calculation of the feedback operation amount for keeping the lateral position LP1 is intentionally delayed to start.

In the assist control D, feedforward control in which the yaw angle is decreased may be executed before the start of the feedforward control in which the subject vehicle M is controlled to travel along the target path TP_LP1. However, the yaw angle before the start of the assist control B is usually equal to zero. The yaw angle may be zero even immediately after the start of the assist control B. Therefore, it is desirable to separately confirm that the yaw angle is not zero before the execution of the feedforward control to decrease the yaw angle.

3. Specific Processing

Figure 9:
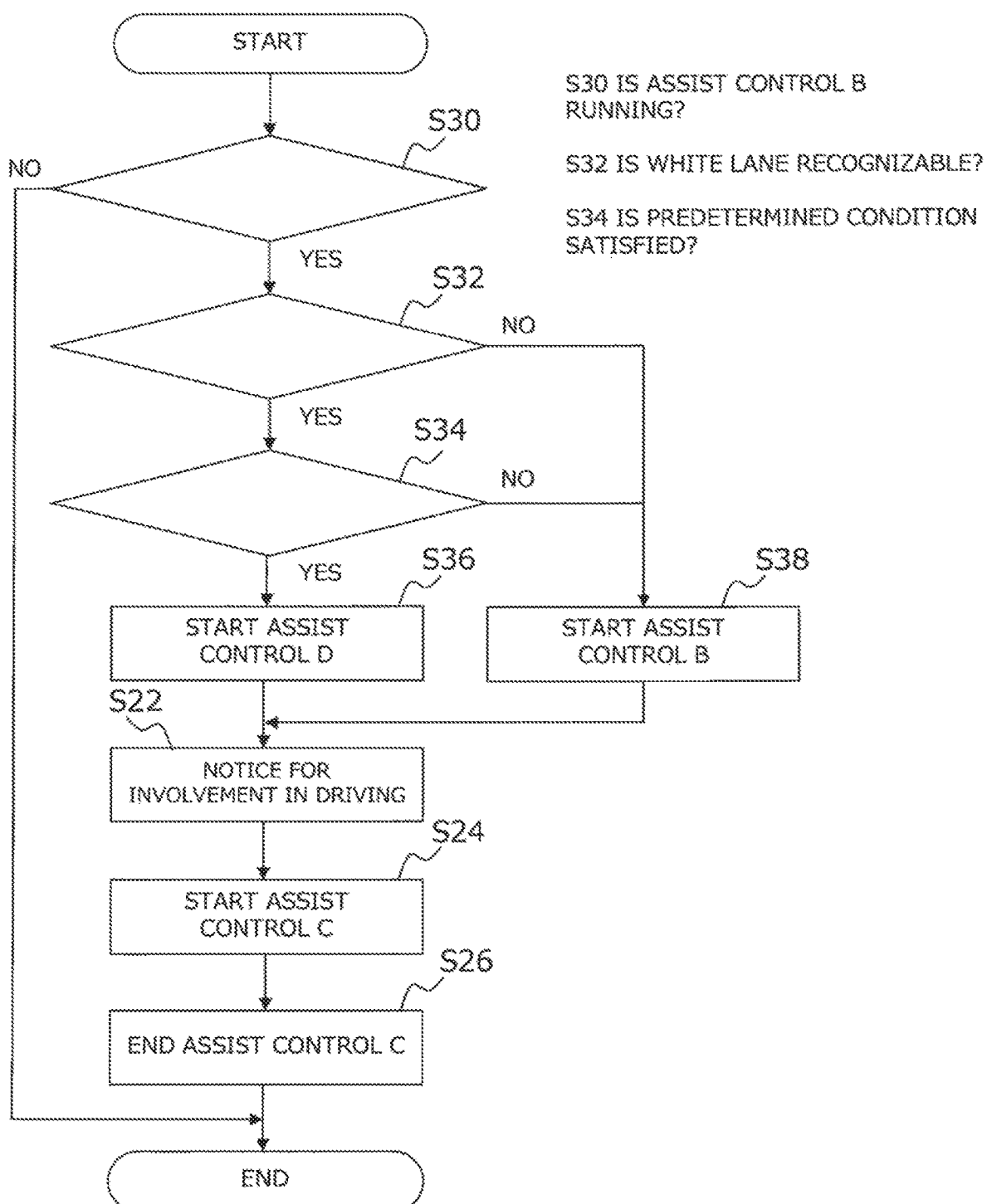
FIG. 9 is a flowchart for describing processing flow when the substitute ECU executes traveling path control in the second embodiment.

FIG. 9 is a flowchart for describing for describing processing flow when the substitute ECU 60 executes traveling path control in the second embodiment. It should be noted that the routine shown in FIG. 9 is repeatedly executed at the predetermined while the activate mode for executing the traveling path control is selected.

As shown in FIG. 9, the substitute ECU 60 first judges whether or not the assist control B is running (step S30). The "running assist control B" here includes not only the case where the assist control B is actually started to execute but also the case where the start of the assist control B is anticipated. The judgement processing is executed based on whether or not the substitute ECU 60 detects the abnormality information and whether or not the target path TP_RS straddles the white lane WL. When it is judged that the assist control B is running, the substitute ECU 60 judges whether or not the white lane WL is recognizable (step S32).

When it is judged in step S32 that the white lane WL is recognizable, the substitute ECU 60 makes a judgement on the progress of the assist control B (step S34). Specifically, the substitute ECU 60 judges whether or not the current progress satisfies the predetermined condition. The predetermined condition is set with the elapsed time TL, the distance LD_CL and the thresholds THL and THD. When the elapsed time TL is shorter than the threshold THL and also the yaw angle is smaller than the threshold THY, the predetermined condition is satisfied. Even when the elapsed time TL is shorter than the threshold THL and also the distance LD_CL is shorter than the threshold THD, the predetermined condition is satisfied.

When it is judged in the step S34 that the predetermined condition is satisfied, the substitute ECU 60 starts to execute the assist control D (step S36). On the other hand, when it is judged in the step S32 that the white lane WL is not recognizable, or when it is judged in the step S34 that the predetermined condition is not satisfied, the substitute ECU 60 continues the execute the assist control B (step S38).

Subsequent to the step S36 or S38, the substitute ECU 60 executes the processing from the steps from S22 to S26.

4. Advantageous Effect

According to the traveling path control according to the second embodiment described above, when the assist control B is executed, the judgement on the progress thereof is also executed. Then, when it is judged that the predetermined condition is satisfied, the assist control D is started to execute before the start of the assist control B or in the middle of the assist control B. In the assist control B, since only the first FF control is executed, it is easily affected by the disturbance. In this regard, in the assist control D, the second FF control is executed. Unlike in the first FF control, the lane change is not continued in the second FF control. Therefore, when the assist control D is started to execute, the lane change is canceled. Instead, when the assist control D is started to execute, it is possible to make the subject vehicle M travel safely along the lane before the lane change.

In the assist control D, the second white lane FB control is started to execute after the start of the second FF control. When the second FF control and the second white lane FB control are started at the same time, there is a possibility that the target steering angle is adjusted in the unintended direction by the execution of the second white lane FB control. In this regard, by delaying the start of the second while lane FB control, it is possible to adjust the target steering angle by the execution of the second white lane FB control after the target steering angle has stabilized to some extent by the execution of the second FF control. That is, it is possible to make the subject vehicle M while keeping the lateral position LP1 after the traveling path of the subject vehicle M roughly matches the target track TP_LP1.

In the second embodiment, the assist control B corresponds to the "first path control" of the second aspect. The assist control D corresponds to the "second path control" of the second aspect.

Third Embodiment

A third embodiment of the present disclosure will be described with reference to FIGS. 10 to 13. Note that since the overall configuration of the vehicle control system according to the third embodiment and the configuration of the main ECU are common to the first embodiment, description thereto are omitted. The configuration of the substitute ECU common to the first embodiment is appropriately omitted.

1. Description of Vehicle Control System

1.1 Description of Substitute ECU 60

Figure 10:
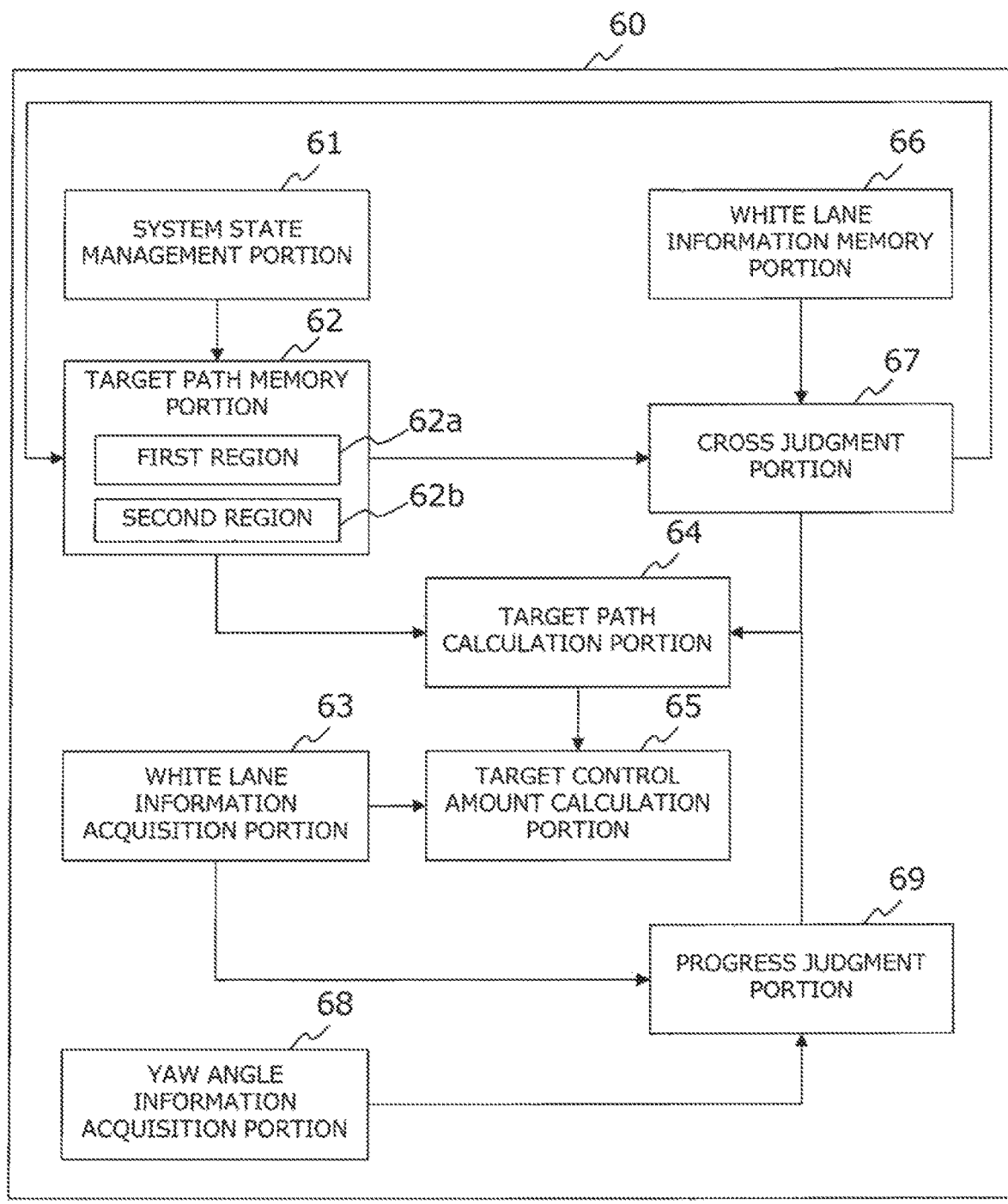
FIG. 10 is a block diagram for showing a functional configuration example of the substitute ECU according to a third embodiment.

FIG. 10 is a block diagram for showing a functional configuration example of the substitute ECU 60 according to the third embodiment. As a function block relevant to the backup, the substitute ECU 60 includes the portions 61 to 69. These function blocks are realized when the processor of the substitute ECU 60 executes control program stored in the memory.

The portion 62 stores the target path TP planned by the portion 53 in a first region 62a when the main ECU 50 operates properly. In the portion 62, the coordinate data of the target positions constituting the target path TP is stored in chronological order. However, the storage of coordinate data is assumed to be temporary. That is, after a certain period of time, the coordinate data in the first region 62a is sequentially erased. The portion 62 transmits the coordinate data stored in the first region 62a to the portion 67.

The portion 67 restores the target path TP based on the backup data from the portion 62 (more accurately, the coordinate data stored in the first region 62a). Based on the target path TP_RS and the coordinate data from the portion 66, the portion 67 judges whether or not the target path TP_RS intersects the white lane WL. The portion 67 transmits the judgement result on the intersection to the portions 62 and 64.

The portion 62 stores copy of the coordinate data stored in the first region 62a in a second region 62b based on the judgement result on the intersection. The copy is stored in the second region 62b when the judgement result indicating the target path TP_RS intersects the white lane WL. The original data of the copy stored in the second region 62b is the coordinate data just before the judgement result indicating the target path TP_RS intersects the white lane WL. The portion 62 transmits the coordinate data stored in the first region 62a and the copy data stored in the second region 62b to the portion 64.

Figure 11:
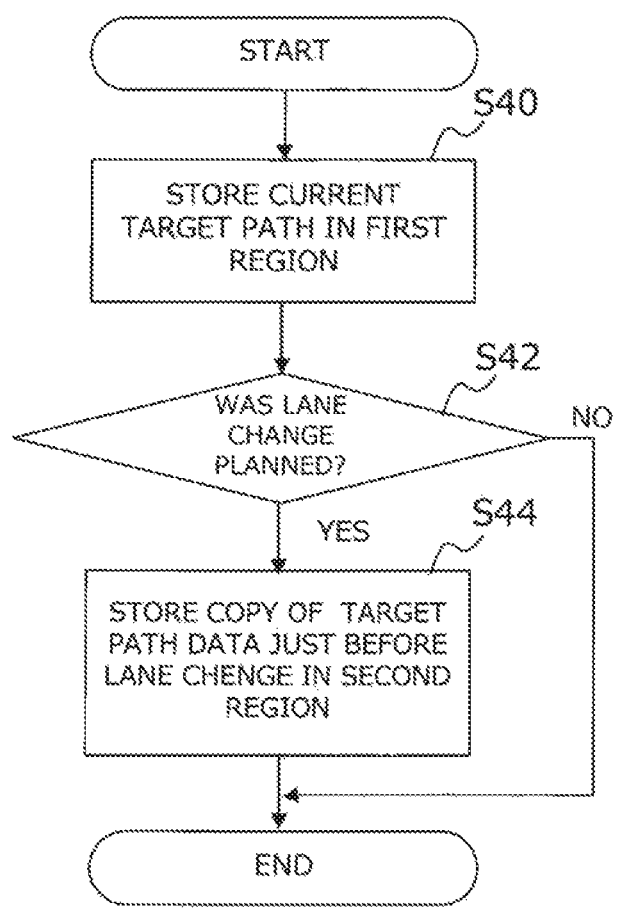
FIG. 11 is a flowchart for describing flow of memory processing executed by a target path memory portion.

FIG. 11 is a flowchart for describing flow of memory processing executed by the portion 62. It should be noted that the routine shown in FIG. 11 is repeatedly executed at a predetermined control period while the activate mode for executing the traveling path control is selected.

In the routine shown in FIG. 11, the coordinate data of the target positions constituting the current target path TP is stored in the first region 62a (step S40). Subsequently, it is judged whether or not the lane change was planned (step S42). The judgement processing is executed based on the judgement result on whether or not the target path TP_RS intersects the white lane WL. When it is judged that the target path TP_RS intersects the white lane WL, it is judged that the lane change was planned. In this case, the copy of the coordinate data of the target positions constituting the target path TP just before the judgement processing of the step S42 is stored in the second region 62b (step S44).

The portion 64 restores the target path TP based on the backup data of the first region 62a. That is, the portion 64 calculates the target path TP_RS. However, when the portion 64 receives from the portion 69 the decision result indicating that it is before or after the start of the assist control B, it restores the target path TP based on the backup data from the second region 62b. That is, the portion 64 calculates the target path TP just before the lane change was planned. For the purpose of illustration, the target path TP_RS based on the backup data of the first region 62a is referred to as a "target path TP_RS1" and the target path TP_RS based on the backup data of the second region 62b is referred to as a "target path TP_RS 2". The target path TP_RS2 is set to branch from the middle of the target path TP_RS1.

The portion 65 calculates the target steering angle for making the subject vehicle M travel along the target path TP_RS1 or TP_RS2. The case of calculating the target steering angle along the target path TP_RS1 has already been described. When calculating the target steering angle along the target path TP_RS2, the portion 65 sets the feedforward operation amount of the steering angle based on the target path TP_RS2 and the current vehicle speed.

Based on the distance information from the portion 63, the portion 65 also calculates the feedback operation amount for keeping the lateral position LP2 just before the lane change was planned. The portion 65 further corrects the feedforward operation amount with the calculated feedback operation amount. It should be noted that the portion 65 starts the calculation of the feedback operation amount for keeping the lateral position LP2 after that of the feedforward operation amount. The reason for this is the same as the reason described in the second embodiment.

2. Features of Traveling Path Control According to Third Embodiment

In the third embodiment, when the abnormality occurs in the main ECU 50, the assist control A, B and C are executed. This is the same as the first embodiment. In the third embodiment, furthermore, assist control E is started to execute when the predetermined condition is satisfied during the execution of the assist control B. The predetermined condition is the same as the one described in the second embodiment. The processing for the assist controls from A to C and E is executed in the substitute ECU 60 shown in FIG. 9.

2.1 Assist Control E

Figure 12:
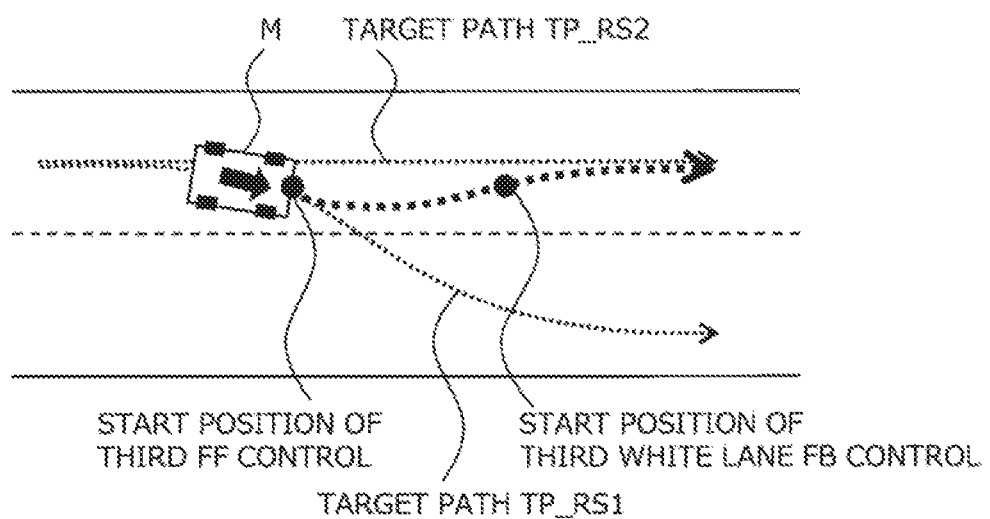
FIG. 12 is a diagram for describing an outline of assist control.

The assist control E is executed when it is judged that it is before or immediately after the start of the assist control B. In the assist control E, the feedforward control is executed to make the subject vehicle M travel along the target path TP_RS 2. In the assist control E, the feedback control is further executed to keep the lateral position LP2. FIG. 12 is a diagram for describing an outline of the assist control E. As shown in FIG. 12, in the assist control E, third FF control is executed. The third FF control is feedforward control based on the target path TP_RS2 and the current vehicle speed. The third FF control is started to execute before or immediately after the start of the assist control B. The start position of the third FF control shown in FIG. 12 represents a switching point between the assist controls B and E immediately after the start of the assist control B.

In the assist control E, third white lane FB control is also executed. The third white lane FB control is feedback control with the distance LD_CL as the feedback control amount. The Lateral position LP2 is typically the middle of the lane before change. In this case, the content of the third white lane FB control is substantially the same as that of the first white lane FB control. However, when the abnormality occurs in the main ECU 50 during the lane change, the lateral position LP2 deviates from the center of the traveling lane. Therefore, in such a case, the feedback operation amount is set to keep the distance LD_CL which was calculated based on distance information at the occurrence of the abnormality. The start position of the third white lane FB control shown in FIG. 12 is positioned ahead of that of the third FF control. This is because that the calculation of the feedback operation amount for keeping the lateral position LP2 is intentionally delayed to start.

3. Specific Processing

Figure 13:
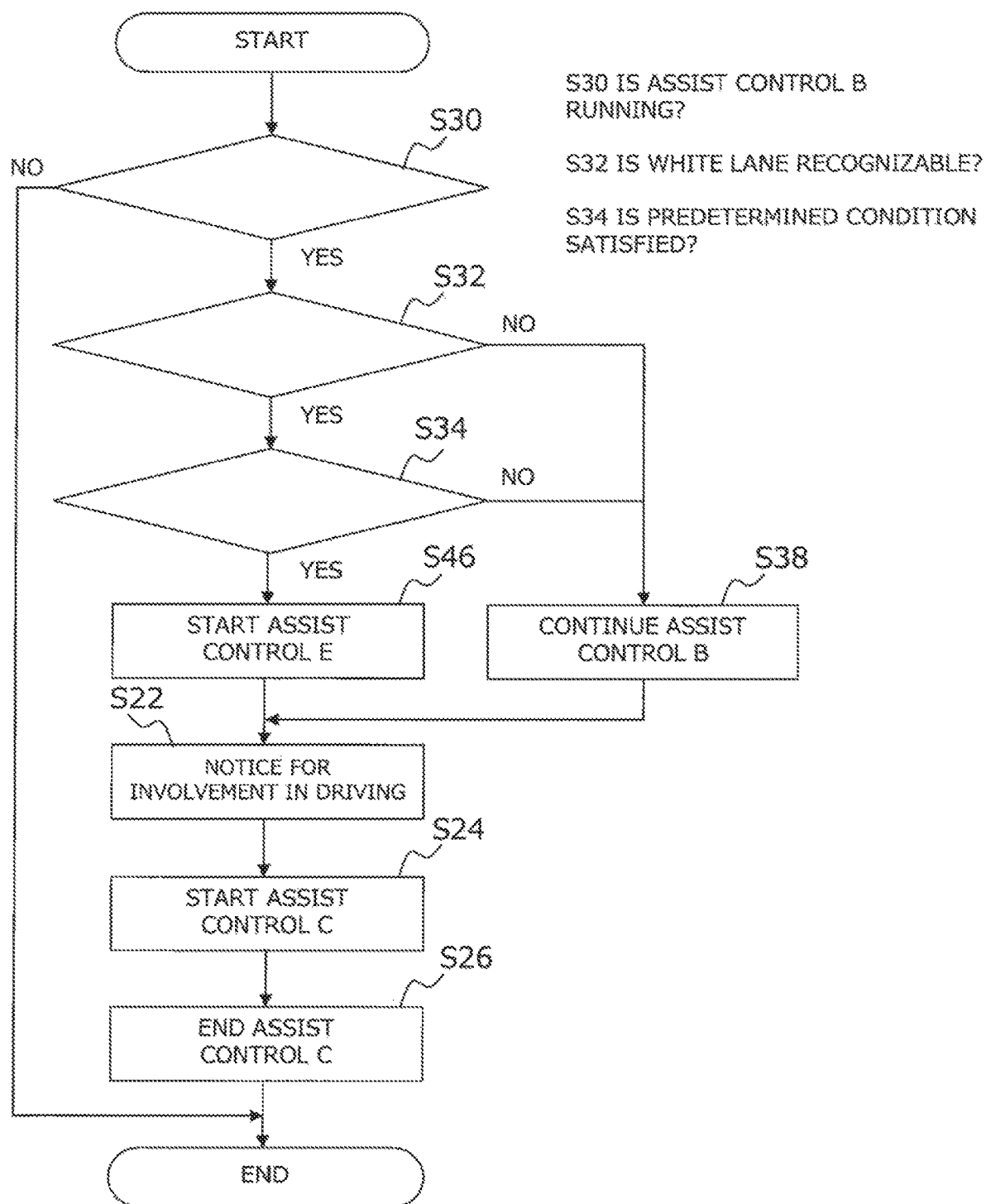
FIG. 13 is a flowchart for describing processing flow when the substitute ECU executes traveling path control in the third embodiment.

FIG. 13 is a flowchart for describing processing flow when the substitute ECU 60 executes traveling path control in the third embodiment. It should be noted that the routine shown in FIG. 13 is repeatedly executed at the predetermined while the activate mode for executing the traveling path control is selected.

As shown in FIG. 13, the substitute ECU 60 executes the processing of steps from S30 to S34. Then, when it is judged in the step S34 that the predetermined condition is satisfied, the substitute ECU 60 starts to execute the assist control E (step S46). On the other hand, when it is judged in step S32 that the white lane WL is not recognizable, or when it is judged in the step S34 that the predetermined condition is not satisfied, the substitute ECU 60 continues to execute the assist control B (step S38).

Subsequent to the step S38 or S46, the substitute ECU 60 executes the processing from the steps from S22 to S26.

4. Advantageous Effect

According to the traveling path control according to the third embodiment described above, when the assist control B is executed, the judgement on the progress thereof is also executed. Then, when it is judged that the predetermined condition is satisfied, the assist control E is started to execute before the start of the assist control B or in the middle of the assist control B. In the assist control B, since only the first FF control is executed, it is easily affected by the disturbance. In this regard, in the assist control E, the third FF control is executed. Unlike in the first FF control, the lane change is not continued in the third FF control. Therefore, when the assist control E is started to execute, the lane change is canceled. Instead, when the assist control E is started to execute, it is possible to make the subject vehicle M travel safely along the lane before the lane change.

In particular, in the third embodiment, the target path TP_RS2 is calculated by restoring the coordinate data stored in the second region 62b. Therefore, it is possible to reduce processing load of the substitute ECU 60 as compared with the second embodiment in which the target path TP_LP1 is calculated separately.

In the assist control E, the third white lane FB control is started to execute after the start of the third FF control. Therefore, it is possible to adjust the target steering angle by the execution of the third white lane FB control after the target steering angle has stabilized to some extent by the execution of the third FF control. That is, it is possible to make the subject vehicle M while keeping the lateral position LP2 after the traveling path of the subject vehicle M roughly matches the target track TP_LP2.

In the third embodiment, the assist control B corresponds to the "first path control" of the fourth aspect. The assist control E corresponds to the "third path control" of the fourth aspect.

Other Embodiments

The vehicle control system according to the first to third embodiments may be modified as follows.

In the first to third embodiments, when the target path TP_RS intersects the white lane WL, the portion 67 judges that lane change was planned just before the occurrence of the abnormality. In other words, when the intersection condition is satisfied, an execution of the lane change, including a plan to execute the lane change in the near future, was detected. However, the execution of the lane change may be detected by other conditions different from the intersection condition. For example, the execution of the lane change may be detected by the portion 61 through judgement processing in which it is judged whether or not the lane change is proposed by the main ECU 50 via the HMI unit 90 and the driver's approval is detected (e.g., operation of a turn signal by the driver). As described above, any conditions are applicable to detect the execution of the lane change in the substitute ECU 60.

What is claimed is:

1. A vehicle control system configured to autonomously control a vehicle to travel along a road, the vehicle control system comprising:
a main controller configured to calculate a pre-abnormality target path;
a substitute controller configured to:
calculate the pre-abnormality target path when an abnormality occurs in the main controller;
acquire information on a lane line around the vehicle;
store backup data of the pre-abnormality target path calculated by the main controller;
calculate, based on the backup data, a first target path based on the backup data which is the pre-abnormality target path just before the occurrence of the abnormality in the main controller;
calculate a first feedforward operation amount of steering angle which is a feedforward operation amount for making the vehicle travel along the first target path;
calculate, based on the information on lane line, a first feedback operation amount which is a feedback operation amount for keeping a distance in a lateral direction from the vehicle to a reference line of a traveling lane along which the vehicle travels;
determine whether or not an execution of a lane change by a vehicle is detected;
based on the execution of the lane change by the vehicle not being detected, correct the first feedforward operation amount with the first feedback operation amount and control the vehicle to travel based on the corrected first feedforward amount; and
based on the execution of the lane change by the vehicle being detected, not correct the first feedforward operation amount with the first feedback operation amount and control the vehicle to travel based on the uncorrected first feedforward amount.

2. The vehicle control system according to claim 1, wherein the substitute controller is further configured to:
calculate a second target path which is the pre-abnormality target path for maintaining the distance in the lateral direction at the occurrence of the abnormality;
based on the execution of the lane change being detected, judge progress of first path control in which the vehicle is controlled to travel along the first target path, based on one of a combination of an elapsed time since the occurrence of the abnormality and yaw angle and on a combination of the elapsed time and the distance in the lateral direction; and
based on a judgment that the progress corresponds to a situation before or a predetermined amount of time after a start of the first path control, start to execute second path control in which the vehicle is controlled to travel along the second target path.

3. The vehicle control system according to claim 2, wherein the substitute controller is configured to:
calculate a second feedforward operation amount of steering angle for making the vehicle travel along the second target path;

calculate, based on the information on lane line, a second feedback operation amount for keeping the distance in the lateral direction at the occurrence of the abnormality;

start to execute the second path control based on the second feedforward operation amount; and start to execute the correction of the second feedforward operation amount with the second feedback operation amount after the start of the second path control.

4. The vehicle control system according to claim 1, wherein the substitute controller is further configured to:

calculate a third target path which is the pre-abnormality target path just before the occurrence of the abnormality and also is not the pre-abnormality target path for lane change;

based on the execution of the lane change being detected, judge progress of first path control in which the vehicle is controlled to travel along the first target path, based on one of a combination of an elapsed time since the occurrence of the abnormality and yaw angle and a combination of the elapsed time and the distance in the lateral direction;

based on a judgement that the progress corresponds to a situation before or a predetermined amount of time after the start of the first path control, start to execute third path control in which the vehicle is controlled to travel along the third target path.

5. The vehicle control system according to claim 4, wherein the substitute controller is configured to:

calculate a third feedforward operation amount of steering angle for making the vehicle travel along the third target path;

calculate, based on the information on the lane line, a third feedback operation amount for keeping the distance in the lateral direction at the occurrence of the abnormality;

start to execute the third path control based on the third feedforward operation amount; and start to execute the correction of the third feedforward operation amount with the third feedback operation amount after the start of the third path control.

* * * * *